Jan. 7, 1936.    C. H. ROGERS    2,026,595
VEHICLE BRAKE
Filed July 22, 1933    3 Sheets-Sheet 1

INVENTOR
CLIFFORD H. ROGERS
BY
ATTORNEY

Jan. 7, 1936. C. H. ROGERS 2,026,595
VEHICLE BRAKE
Filed July 22, 1933 3 Sheets-Sheet 3

INVENTOR
CLIFFORD H. ROGERS
BY
ATTORNEY

Patented Jan. 7, 1936

2,026,595

UNITED STATES PATENT OFFICE 2,026,595

VEHICLE BRAKE

Clifford H. Rogers, Portland, Oreg., assignor of twenty-four per cent to John Kaufman and twenty-four per cent to J. K. Carr, both of Portland, Oreg.

Application July 22, 1933, Serial No. 681,719

17 Claims. (Cl. 188—90)

My invention relates to vehicle braking apparatus and particularly to the type provided with fluid pumping elements secured to the running gear and adapted to be operated by the latter. Said pumping elements discharge into a conduit having several branches, said branches constituting integral portions of a closed passageway, each branch discharging into a common inlet, thus providing for the recirculation of the fluid by the pumping element. Braking apparatus of this general type is shown in the application for patent filed January 17, 1933 by myself, which was entitled Vehicle braking mechanism and was given Serial No. 652,163. My present application is intended as an improvement upon my previous application. The specific improvements of my present application over the devices shown in said application are as follows:

The closed conduit or passageway leading from the discharge port to the intake port comprises several branches which are each open throughout their entire length, said passageways including no valved openings thru which the operating fluid and air are required to pass. Inasmuch as these pumping elements must be operable to brake a vehicle both when it is proceeding forwardly and rearwardly, said open passageways prevent the formation of any partial vacuum at the non-pumping side of the pumping element. The restriction to flow thru said passageways constituting said conduit is attained by the use of variable apertures and one-way flow thru said passageways is secured by jets and by a separator element in which a space is arranged separating the liquid constituting the brake-operating fluid from the air contained in the pumping elements when said pumping elements are running idle.

I provide an auxiliary reservoir housing said separator mechanism and the jets for maintaining one-way flow thru the reservoir. Said auxiliary reservoir has a capacity comparable to that of the braking element and is arranged immediately adjacent the intake port of the latter. Said reservoir is of substantially greater cross-section than the feed line leading from the main control cylinder to each of the pumping elements.

The rotor of the pumping element is provided with cored out chambers which are joined with the operating chamber of the pump only by the clearance between the rotor and the side of the casing and said cored out chambers thus provide cushioning chambers not only to accommodate the air forced out of the pumping chamber by the operating fluid, but also to provide a means tending to exhaust said operating fluid when it is desired to have said pumping element idle.

The extensible vanes of said rotor are made in halves and the outer ends are beveled toward one face, the straight faces of said vanes facing the operating chamber and the beveled portions facing each other. This permits the relatively sharp edges thus formed to bear against the inner face of the pump casing and prevents any portion of said vanes from being subject to end pressure tending to depress the vanes and move them out of operating position.

A diaphragm-actuated control valve is arranged in said passageway and is adapted to be seated in the presence of a predetermined pressure existing in said passageways, said predetermined pressure being selectively either a maximum pressure or a minimum pressure.

The closed conduit or passageways connecting the discharge port with the intake port of each pumping element comprise a plurality of branches each leading to a spaced discharge port located in spaced relation with the pumping stroke of the pumping element. Each of said branches is provided with an adjustable orifice so as to regulate the resistance to flow thru said orifice and thus thru said branch and the braking effect is controllable thru each of said branches with respect to the other branches constituting said passageway.

The details of construction and the mode of operation of my improved vehicle braking mechanism are hereinafter described with reference to the accompanying drawings in which.

Figure 3:
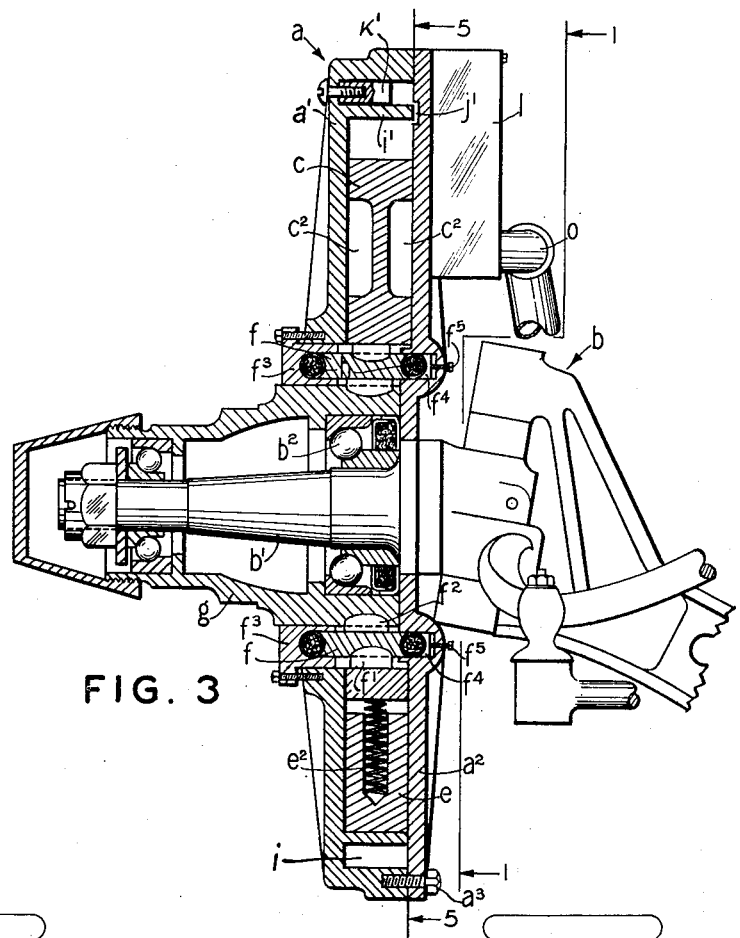
Fig. 3 is a section thru one of said pumping elements, said figure being taken on the line 3—3 in Fig. 1.
Figure 5:
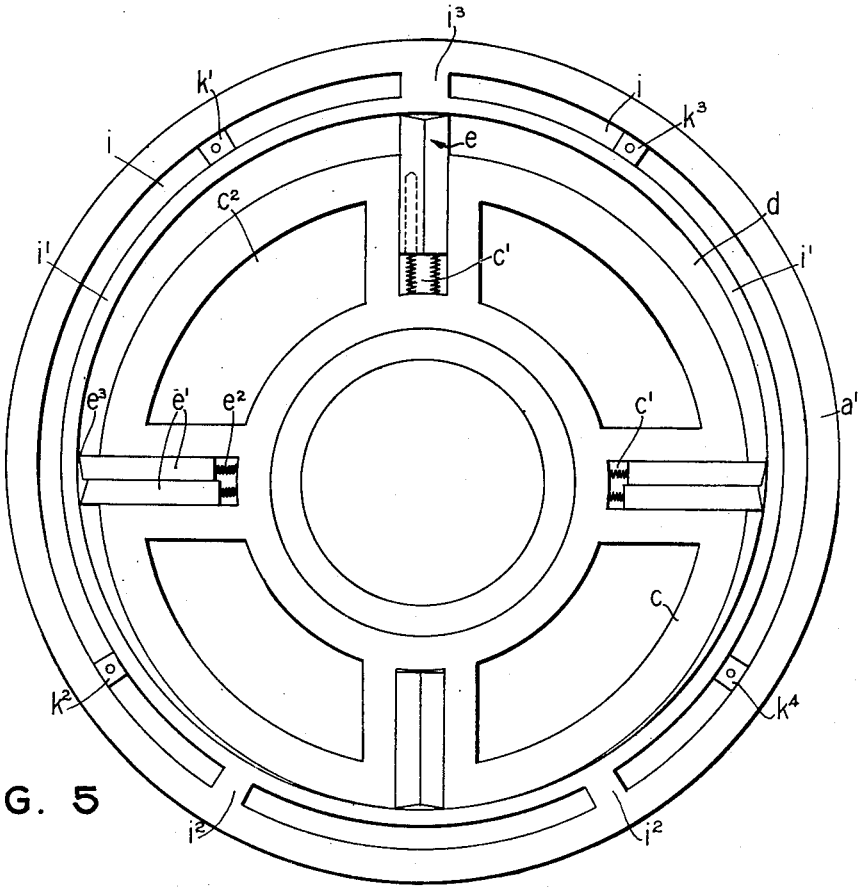
Fig. 5 is a sectional view taken on the line 5—5 in Fig. 3.

The brake-type pumping element comprises a cylindrical casing $a$, which is press-fitted upon or welded to the spindle body $b$ of one of the front wheels of an automobile. It is to be understood that said brake elements are also fixed to the rear wheels, or may be affixed to any other portion of the running gear of an automobile or similar vehicle so as to be operated thereby. The hub $g$ is supported by ball or other anti-friction bearings $b2$ upon the spindle $b'$, the spindle extending laterally from the spindle body and being non-rotative. A rotor $c$ is journaled in said casing upon an axis eccentric to that of the cylindrical casing. Thus a crescent-shaped aperture $d$ is provided about the periphery of the rotor, as is shown in Fig. 5, and extensible vanes $e$ project into said aperture and bear against the bore of said casing. The casing preferably is made in halves and one half $a'$ is cupped, the other half $a2$ being substantially flat, and when the parts are arranged in registration they are bolted together by bolts $a3$, as is shown in Fig. 3. The rotor also is carried by the anti-friction bearings $b2$ mounted upon the spindle $b'$. Intermediate said rotor bearing and the operating portions of the rotor is an annular metallic packing ring $f$, which is held both to the hub $g$ and the rotor body $c$ by keys $f'$ and $f2$, respectively. Arranged at each side of said packing ring is a section of packing material $h$, which is annular in form and circular in cross-section. Bearing against the other side of said packing material is a packing nut $f3$ bolted into the casing and at the other side is a packing follower element $f4$ which is permitted limited adjustment by a series of tapped screws $f5$. The faces of the packing ring, the packing nut, and the packing follower are grooved to conform to the outline of the packing ring, as is shown in Fig. 3.

The rotor $c$ is provided with radially-arranged slots $c'$ which open to the periphery of said rotor and vanes $e$ are slidably mounted therein. Each of said vanes is made up of two members disconnected from each other but operating in pairs as a single element. Said vane is composed of two members so as to permit the ends of said members to move relatively, thus to accommodate them to the position of the crescent-shaped aperture $d$ and with regard to the rotor. That is, said rotor is mounted eccentrically with regard to the casing and thus the vanes are arranged at slightly different angles with regard to the bore of the casing in various positions and thus to prevent the operating fluid from acting against said ends to depress them in the slot it is necessary that some means be provided for eliminating the possibility of end pressure. That is accomplished by beveling the ends of the members making up each of said vanes so that their outer faces touch the bore of the casing, while the inner faces are spaced therefrom. Attention is called to Fig. 5. It is to be noted that when the vanes are rotated and enter the broader portions of the crescent-shaped aperture, the vane located in advance is permitted to extend out of the slot $c'$ a greater distance while the opposite condition is true when the vanes are approaching that portion of the aperture which is of lesser breadth.

Each of said vane halves $e'$ is extended outwardly by its individual spring $e2$ and the beveled ends $e3$ of each of said halves face outwardly so that the outer faces are flush with the bore of the casing.

It is desirable that the rotor have a free-running fit within the casing $a$, not only to eliminate friction, but also so that the air normally contained within the aperture when the pumping element is not operating may pass downwardly along the face of the rotor and enter the air-cushioning chambers $c2$, which lie between the radial slots $c'$. That is, when all of the liquid has been discharged from the casing, air fills the chamber $d$. When liquid is forced from the control cylinder $p$ into the chamber $d$, there is no means provided for the escape of the air except into said chambers $c2$. Said air thus is displaced by the liquid and the air is compressed into said chambers $c2$. By regulating the play between the rotor and the casing, the air can be permitted to pass into the chambers $c2$ while substantially all of the liquid is retained within the crescent-shaped chamber $d$ and in the conduits leading therefrom. Thus said chambers $c2$ are air-filled and during operation are subject to substantial pressure produced by the displacement of the air normally contained within the crescent-shaped chamber $d$ by the liquid moving thru said chamber $d$. By the same token the tendency for a partial vacuum to be formed behind the vanes $e$ is compensated, more or less, by the passage of air from the chambers $c2$ into the chamber $d$ behind said valves. There is sufficient play between the sides of the vanes and the bores in which said vanes move to prevent the production of a vacuum therein which vacuum would tend to prevent said vanes from being moved outwardly by the action of the springs $e2$ and the effect of centrifugal force. Inasmuch as there are four radial slots shown in the modification illustrated in the drawings, there are likewise four spaces between the slots. To secure balance I arrange said rotor to have a central web $c3$ extending along the median line of the rotor, and thus there are two chambers $c2$ arranged in pairs, one upon each side of the web. Thus in the entire rotor there are eight chambers $c2$, each occupying a segment of the rotor.

Housed within the casing $a$ is a groove $i$, which extends substantially about said casing and lies exteriorly of the crescent-shaped aperture $d$. Said groove is not continuous but comprises two separate courses each, terminated at one end by spaced partitions $i2$ and separated at a point substantially diametrically opposite said partitions $i2$ by a partition $i3$. The partition $i3$ overlies the portion of greatest width of the crescent-shaped aperture $d$ and the partitions $i2$ are arranged at points where said aperture diminishes to negligible breadth. At each side of said pump-type brake element are by-passes $j'$ and $j2$ on one side of the braking element, and $j3$ and $j4$ at the other side. Said by-passes are spaced apart slightly less than 90° and are located in each course substantially equidistant from said partitions $i2$ and $i3$, respectively. Said by-passes connect the crescent-shaped aperture $d$ with the courses of the groove $i$ and may either be cut into the face of the flange $i'$, which lies between the crescent-shaped aperture $d$ and the groove $i$, or may be relieved in the flat half $a2$ of the casing so as to extend about the edge of said flange.

Figure 1:
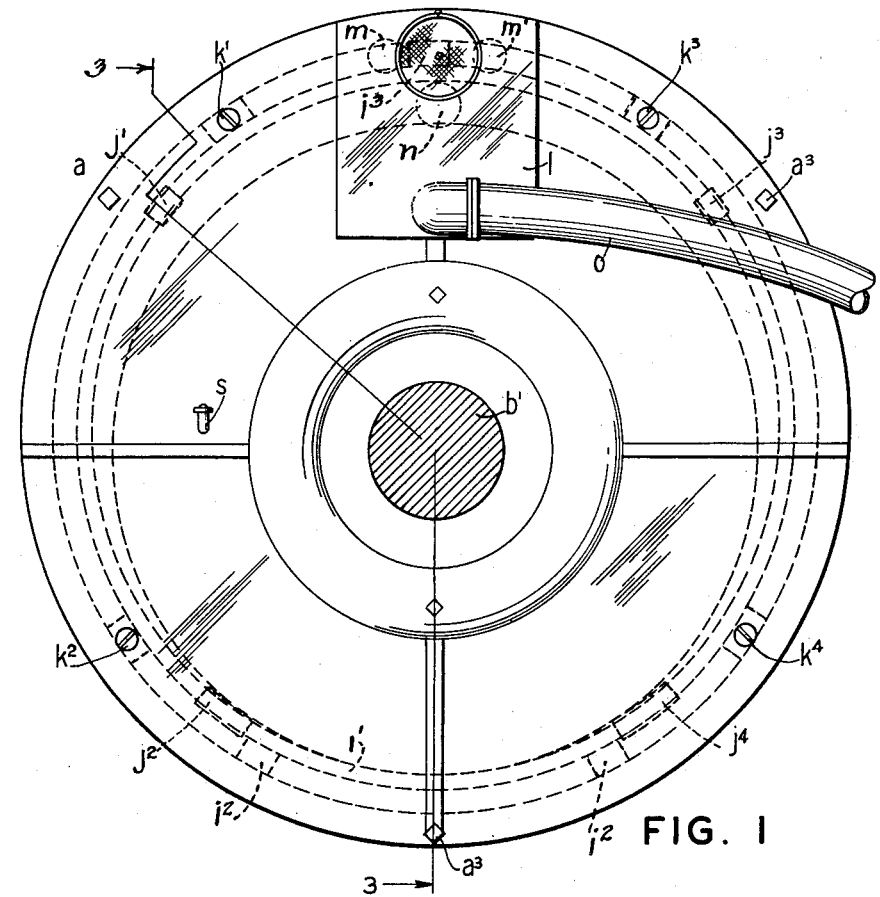
Fig. 1 is generally an elevation of one of the pump-type brake elements embodying my invention and said figure is taken on the line 1—1 in Fig. 3.

Inasmuch as said pumping type brake operates by moving the operating fluid from the point in the aperture $d$ of greatest depth toward the portions of lesser depth, said vanes tend to expel said operating liquid either thru the by-pass $j'$ or $j2$ if said braking element is operating in one direction, or thru the by-passes $j3$ and $j4$ if said element is operating in the other direction. If the crescent-shaped aperture $d$ is only partially full of operating fluid, the major portion will pass thru either the by-passes $j2$ or $j4$, depending upon the direction of rotation of the rotor. Only the excess amounts will be passed thru the other of said by-passes. So as to regulate the degree of braking action to be imposed by said element, I arrange control valves $k'$, $k2$, $k3$ and $k4$ adjacent the by-passes $j'$, $j2$, $j3$ and $j4$, respectively. Said valves comprise square bodies, as is shown in Fig. 5, which slidably engage the walls of the groove $i$. They are moved into and out of said groove by screw-threaded portions, as shown in Fig. 1. The heads of said screw-threaded members are provided with a transverse slot, thereby adapting them to be engaged by a screwdriver and said heads extend thru and face the exterior of the casing. Thus by regulating the external controls therefor as shown in Fig. 1, an adjustable orifice can be provided adjacent the discharge side of each by-pass thru which the operating fluid must flow.

Figures 6, 7:
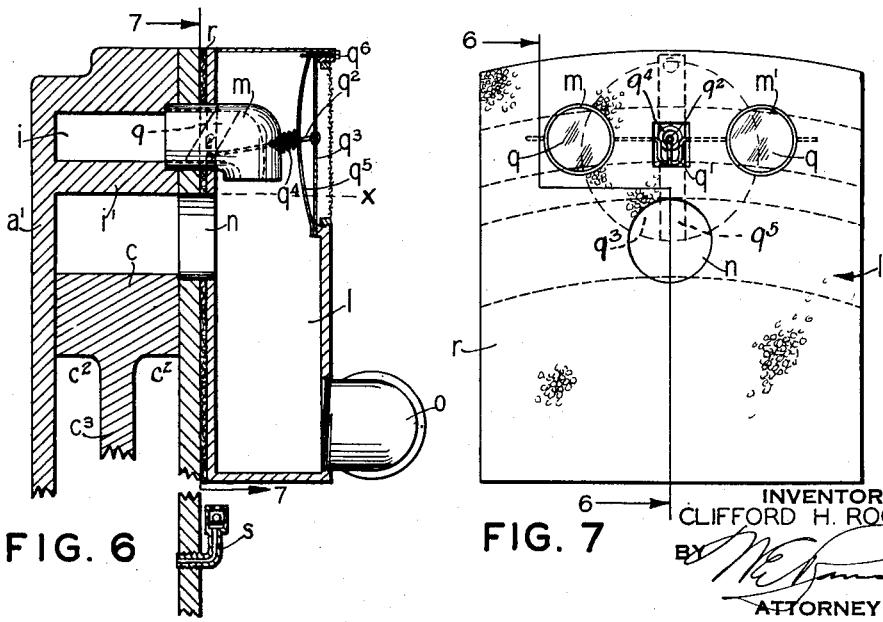
Fig. 6 is a sectional elevation thru the auxiliary reservoir and the associated parts of said pumping element, said figure being taken substantially on the line 6—6 in Fig. 7.
Fig. 7 is an elevation of said auxiliary reservoir taken on the line 7—7 in Fig. 6.

The groove $i$ discharges into the auxiliary reservoir $l$, arranged exteriorly of the casing $a$. Said reservoir lies exteriorly of that portion of the crescent-shaped aperture $d$ of greatest depth, as is shown in Fig. 6. Extending thru the wall of the casing $a$ at this point are two nozzle-type jets $m$—$m'$ lying at opposite sides of the partition $i3$. Operating fluid which is directed into the groove $i$ thus is discharged thru said nozzle-type jets into the auxiliary reservoir and is returned from said reservoir to the crescent-shaped aperture $d$ thru a port $n$, if the level of the operating fluid in said reservoir stands above the bottom of said port $n$.

The principal supply conduit $o$, for each of said pump-type brake elements leads to a central cylinder $p$, provided with a treadle-operated piston $p'$. The auxiliary reservoir $l$ is of sufficient size as to have a capacity comparable to that of the pumping element and thus by retracting the treadle-operated piston $p'$ by the spring $p2$, said auxiliary reservoir is emptied and it will retain all of the operating fluid contained in the pump-type braking element. Vice versa, by actuating said treadle-operated piston, the contents of said auxiliary reservoir are deposited within the casing $a$ and the rotor is required to circulate said operating fluid thru the passageways described heretofore.

The central cylinder $p$ has a capacity equal to the combined capacity of the auxiliary reservoirs $l$ and the discharge from said central cylinder displaces the contents of said reservoirs into the casings upon which said reservoirs are located. When the treadle-operated piston is retracted, it likewise subtracts or removes from said auxiliary reservoirs a like amount of liquid.

To lock the rotor within the casing, I provide two simultaneously-actuated valves $q$ adapted to interrupt flow through the jets $m$—$m'$, which are operated by a common crank shaft $q'$. Said crank shaft is connected by a link $q2$ to a diaphragm $q3$. Said diaphragm forms one of the walls of the auxiliary reservoir $l$ and is of sufficient size and flexibility to give an adequate throw to the crank shaft $q'$. Lying between said diaphragm and one of the fixed portions of said auxiliary reservoir is a coiled adjusting spring $q4$, one end of which is secured to the link $q2$. The other end of said spring bears against a pivoted bar $q5$ which is provided at its free end with an adjusting screw $q3$. Said diaphragm $q3$ is thus adjustable to yield in the presence of a predetermined amount of pressure. Thus, if the operating treadle is stepped on hard and the entire auxiliary reservoir is completely filled and the parts housed within the casing $a$ are likewise filled, a substantial pressure will be built up throughout the braking element and said pressure will act upon one face of said diaphragm, which will yield and cause the valves $q$ to be seated to prevent the rotor from being operated because of the interruption in the closed circuit thru which the operating fluid passes.

Figure 2:
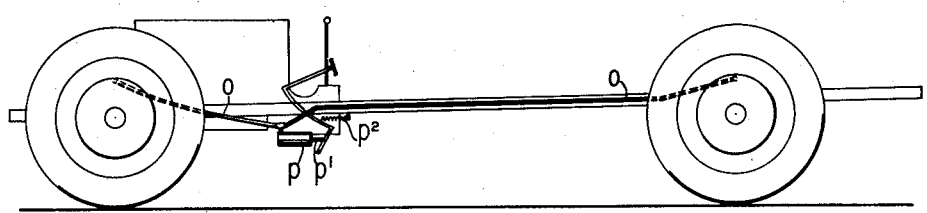
Fig. 2 is a diagrammatic elevation of an automobile chassis showing the control pumping cylinder and the conduit leading from said cylinder to the braking elements.
Figure 4:
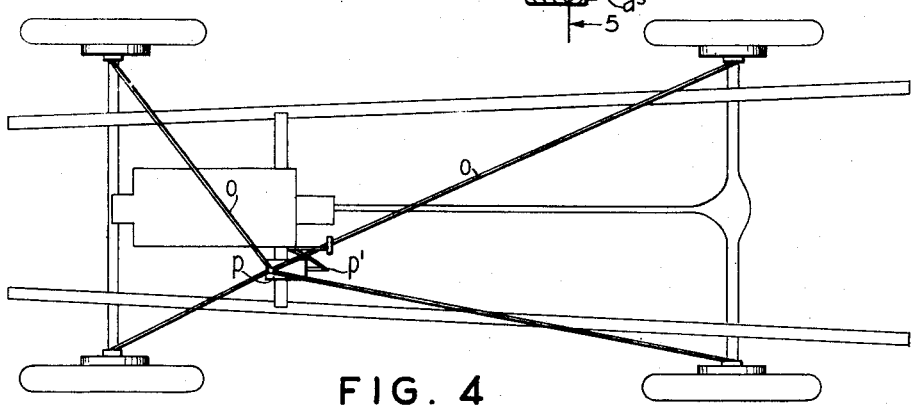
Fig. 4 is a diagrammatic plan view of the devices shown in elevation in Fig. 2.

As is noted in Figs. 2 and 4, the pumping cylinder $p$ is connected to each of the braking elements on the four wheels of the automobile. The conduits $o$ all lead upwardly from said cylinder to the braking element and thus when the piston $p'$ for said cylinder is retracted by the spring $p2$, the operating fluid will tend to drain thru said conduits to the main pumping cylinder $p$.

The crank shaft $q'$ has bearings in the face of the auxiliary reservoir $l$, being recessed therein, and a cork gasket $r$ overlies the entire face of said auxiliary reservoir. Said gasket thus not only tends to prevent leakage between the auxiliary reservoir and the face of the casing $a$, but also serves as a resilient element for holding said crank shaft $q'$ in the recessed portion of the auxiliary reservoir and seals said crank shaft and the nozzle-type jets $m$—$m'$.

When said braking elements are used for a long period of time without being released, there is a tendency for the air in some of the air cushioning chambers $c2$ to become lost, and I thus provide a valve-controlled vent $s$, extending thru the walls of said casing so as to prevent the formation of any partial vacuum within said air cushioning chambers. The valve in said vent tends to prevent the exhausting of air from said chambers, but to permit the ready replacement of any air lost thru any cause whatsoever.

As has been pointed out, each of said pumping type brakes operates by reason of the circulation of operating fluid thru the crescent-shaped aperture, caused by the rotation of the rotor and the interception of any operating fluid between the vanes. Said operating fluid is caused to be displaced from said crescent-shaped aperture thru the by-passes $j'$, $j2$, $j3$ and $j4$ and is returned to the auxiliary reservoir $l$ by the groove $i$. When it is discharged into said reservoir from either of the nozzle-type jets $m$—$m'$, it must pass thru a stratum of air normally overlying the level of the liquid contained within said reservoir. The presence of said stratum of air thus tends to prevent the reverse flow of liquid thru said pump and tends to permit the ready flow of air thru all of the portions of the groove and thru the by-passes. That is, there is no obstruction to flow of liquid thru any portion of the casing except by the operation of said rotor and its extended vanes and the automatic locking valves and thus in normal operation there is no tendency to build up a partial vacuum in any portion of the passageways. One-way liquid flow is maintained because of said nozzles and the separation in the streams of liquid discharge from the nozzle-type jets $m$—$m'$ and into said auxiliary reservoir. As has been pointed out, the fluid is returned from said reservoir into the crescent-shaped aperature $d$ thru the port $n$ when the level of the liquid in said auxiliary reservoir extends above the plane of said port.

The provision of two by-passes at each side of the pump is of substantial importance, for the reason that when only a small portion of operating fluid is used, the major portion is forced thru the ports arranged adjacent the shallowest portion of the crescent-shaped aperture, while when a larger amount of operating fluid is used, it is divided between said ports. Thus, by arranging a control adjacent each of said ports, the pattern of the braking action of each pump can be regulated. Thus when a small amount of operating fluid is acted upon, as when the treadle is depressed but a slight degree, one type of braking action can be secured, and a different type of braking action can be provided when the treadle is depressed further, so as to force a greater quantity of fluid into the casing. This is particularly advantageous with four-wheel brakes. Experience has determined that when the brakes are first applied the brakes upon the front wheels of a car restrain the forward motion thereof to a greater degree than do those on the rear wheels. That is, if brakes give the major portion of the braking action to the front wheels, such application of the brakes would be desirable. At slower speed, however, and when the car is approaching a stop, the application of the major portion of the braking action on the front wheels is dangerous, for the reason that it might throw the automobile into a front end skid. It is desirable, therefore, that the major portion of the braking action be applied to the front wheels when the car is moving fast, or at the beginning of the braking action, and that the condition be reversed at the end of said braking action or when the car is moving slowly.

By providing two ports or by-passes leading from the crescent-shaped aperture to the groove $i$, which serves as a return flow from each of the braking elements, I provide means for attaining such difference in pattern. The brakes upon the front wheels of an automobile can be arranged so that the adjustable control valves $k2$ and $k4$ adjacent the ports $j2$ and $j4$, respectively, extending from the crescent-shaped aperture of minimum depth can be substantially closed and the valves $k'$ and $k3$ leading from the by-passes $j'$ and $j3$, respectively adjacent the deeper portion of said crescent-shaped aperture can be set relatively wide open. The opposite setting can be provided for the brake elements arranged upon the rear wheels of the automobile and thus when the brakes are first applied the closer setting on the front wheels causes more braking action to be applied to said front wheels, but when the brakes are applied harder the opposite condition is attained. By providing adjustment of both by-passes, the desirable braking efforts can be regulated on each of the four wheels independently of each other, or in pairs, front and rear.

The operation of said brake element may be summarized as follows:

As has been commented upon, the pumping cylinder $p$ has a capacity equal to the aggregate capacity of the various auxiliary reservoirs $l$. Each of said reservoirs is located upon a pumping element and as is indicated in Fig. 4, there may be four of such pumping elements, one upon each of the four wheels of an automobile. Thus, by a single depression of the treadle-operated piston, liquid can be supplied to each of the auxiliary reservoirs and thru them to each of the pumping elements upon the wheels of an automobile. Liquid is supplied to each of said auxiliary reservoirs by a pipe $o$ and the operation of each device is similar to that of every other one and thus the operation of but one pumping element will be described. Liquid enters thru the bottom of the auxiliary reservoir and the contents thereof are forced thru the port $n$ into the crescent-shaped cylinder $d$. The liquid is then forced about said crescent-shaped chamber, depending upon the direction of rotation of the rotor $c$, clockwise or counter-clockwise, as viewed in Fig. 5. The liquid enters the crescent-shaped chamber $d$ at the point of maximum width, as is indicated in Fig. 1, and said liquid is progressively moved thru said chamber toward the pointed ends thereof. The liquid is released thru by-passes $j'$, $j2$, $j3$, or $j4$, depending upon the setting of the valves $k'$, $k2$, $k3$ and $k4$, and depending upon the rotation of the rotor within the casing. Said by-passes are adapted to release the liquid from the chamber $d$ and into the groove $i$, where it is returned to the auxiliary reservoir $l$ thru the nozzles $m$ or $m'$, depending upon the direction of rotation of the rotor. The normal level of the liquid in the reservoir $l$ is at the line $x$ in Fig. 6, which is just below the port $n$. When the piston $p'$ forces more liquid into the auxiliary reservoir, of course the level raises and said liquid pours thru the port $n$ into the chamber $d$, as has been described. Depending, of course, upon the quantity of the liquid forced into said chamber and the viscosity thereof, the level of said liquid rises and approaches the mouths of the nozzles $m$ and $m'$. If under operating conditions the pressure becomes too great, it results in the distortion of the diaphragm $q3$ and the circulatory system is interrupted and the rotor is locked in position. The nozzle-like discharge of the liquid from the groove $i$ tends to force said liquid away from the companion nozzle and the velocity thereof tends to prevent reverse flow into the other side of the chamber $d$. That is, the mouths of the nozzles $m$ and $m'$ are located in the plane above the port $n$ and thus there is normally a stratum of air underlying said nozz'e mouths, which prevents said liquid from passing into the companion nozzle rather than entering said chamber $d$ thru the port $n$.

I claim:

1. In vehicle braking mechanism, a brake element of the pump type, a closed conduit joining the discharge side of said brake element to the intake side thereof, a single intake port arranged at the intake side of said brake element and a plurality of discharge ports arranged in spaced relation along the discharge side of said element, a plurality of by-passes discharging into and constituting a part of said conduit, and a restricting orifice operatively arranged in certain of said branches, thereby adapted to regulate the resistance to flow thru said branches.

2. In vehicle braking mechanism, a brake element of the pump type, a closed conduit joining the discharge side of said brake element to the intake side thereof, a single intake port arranged at the intake side of said brake element and a plurality of discharge ports arranged in spaced relation along the discharge side of said element, a plurality of by-passes discharging into and constituting a part of said conduit, and an adjustable restricting orifice operatively arranged in certain of said branches, thereby adapted to regulate the resistance to flow thru said branches.

3. In vehicle braking mechanism, a brake element of the pump type, a closed conduit joining the discharge side of said brake element to the intake side thereof, a principal reservoir of operating fluid for said brake element arranged exteriorly of said conduit, and provided with means for adding to and subtracting fluid from said pump element, a nozzle and an auxiliary reservoir constituting a part of said conduit, said reservoir arranged adjacent the intake port for said pump element, said nozzle discharging into said auxiliary reservoir at a point spaced above the plane of said intake port, thereby to maintain a stratum of air between the operating fluid and said nozzle.

4. In vehicle braking mechanism, a brake element of the pump type, a closed conduit joining the discharge side of said brake element to the intake side thereof, a principal reservoir of operating fluid for said brake element arranged exteriorly of said conduit, and provided with means for adding to and subtracting fluid from said pump element, an auxiliary reservoir constituting a part of said conduit, said auxiliary reservoir arranged adjacent the intake port for said pump element, said principal reservoir communicating with said auxiliary reservoir at a point below the plane of said intake port.

5. In vehicle braking mechanism, a brake element of the pump type, a closed conduit joining the discharge side of said brake element to the intake side thereof, a principal reservoir of operating fluid for said brake element arranged exteriorly of said conduit, and provided with means for adding to and subtracting fluid from said pump element, a nozzle and an auxiliary reservoir constituting a part of said conduit, said auxiliary reservoir arranged adjacent the intake port for said pump element, said nozzle discharging into said auxiliary reservoir at a point spaced above the plane of said intake port, thereby to maintain a stratum of air between the operating fluid and said nozzle, said principal reservoir communicating with said auxiliary reservoir at a point below the plane of said intake port.

6. In vehicle braking mechanism, a brake element of the rotary pump type provided with a casing, an eccentrically-mounted rotor journaled therein, the space between the periphery of said rotor and the bore of said casing constituting a pumping chamber, an extensible vane carried by said rotor extending thru said chamber and engaging the bore of said casing, and a chamber arranged in said rotor and communicating with the pumping chamber only thru the operating clearance between said rotor and said casing.

7. In vehicle braking mechanism, a brake element of the rotary pump type provided with a casing, an eccentrically-mounted rotor journaled therein, the space between the periphery of said rotor and the bore of said casing constituting a pumping chamber, an extensible vane carried by said rotor extending thru said chamber and engaging the bore of said casing, a chamber arranged in said rotor and communicating with the pumping chamber only thru the operating clearance between said rotor and said casing, an aperture leading thru said casing and operating so as to communicate with said rotor chamber, thereby to prevent a partial vacuum from being set up in said rotor chamber.

8. In vehicle braking mechanism, a brake element of the rotary pump type provided with a casing, an eccentrically-mounted rotor journaled therein, the space between the periphery of the rotor and said bore of said casing constituting a pumping chamber, an extensible vane carried by said rotor extending thru said chamber and engaging the bore of said casing, a chamber arranged in said rotor and communicating with the pumping chamber only thru the operating clearance between said rotor and said casing, a valved aperture leading thru said casing and operating so as to communicate with said rotor, thereby to prevent a partial vacuum from being set up in said rotor chamber.

9. In vehicle braking mechanism, a brake element of the pump type, a closed conduit joining the discharge side of said element to an intake port therein, a reservoir of operating fluid, a pump element adapted to discharge fluid into and to subtract fluid from said brake element, an auxiliary reservoir having a capacity approximately that of said brake element arranged intermediate said first-mentioned reservoir and said brake element and communicating with both, said auxiliary reservoir being arranged adjacent and communicating with the intake port of said brake element.

10. In vehicle braking mechanism, a brake element of the pump type, a closed conduit joining the discharge side of said element to an intake port therein, the end of said closed conduit arranged at the intake side of said brake element terminating in a nozzle-like orifice, a reservoir of operating fluid, a pump element adapted to discharge fluid into and to subtract fluid from said brake element, an auxiliary reservoir arranged intermediate said first-mentioned reservoir and said brake element and communicating with both, said auxiliary reservoir being arranged adjacent and communicating with the intake port of said brake element, said nozzle-like orifice discharging into said auxiliary reservoir at a point spaced above the point of communication between said auxiliary reservoir and said intake port, thereby providing a stratum of air between the discharge nozzle and said intake port.

11. In vehicle braking mechanism, a brake element of the pump type, said brake element being reversible, two closed conduits each joining a discharge side of said brake element with the intake side thereof, the ends of said closed conduits arranged at the intake side of said brake element each terminating in a nozzle-like orifice, a reservoir of operating fluid, a pump element adapted to discharge fluid into and to subtract fluid from said brake element, an auxiliary reservoir arranged intermediate said first-mentioned reservoir and said brake element and communicating with both, said auxiliary reservoir being arranged adjacent and communicating with the intake port of said brake element, said nozzle-like orifices discharging into said auxiliary reservoir at points spaced above the point of communication between said auxiliary reservoir and said intake port, thereby providing a stratum of air between the discharge nozzles and said intake port.

12. In vehicle braking mechanism, a brake element of the pump type, a closed conduit joining the discharge side of said element to an intake port therein, a valve adapted to open and close said conduit, said valve being provided with a control member having one portion subject to the pressure of the operating fluid in said brake element, and another opposed portion subject to a predetermined pressure.

13. In vehicle braking mechanism, a brake element of the pump type, a closed conduit joining the discharge side of said element to an intake port therein, a valve adapted to open and close said conduit, said valve being provided with a distortable diaphragm having one face subject to the pressure of the operating fluid in said brake element, the other face being subject to a predetermined pressure.

14. In vehicle braking mechanism, a brake element of the pump type, two closed conduits each joining a discharge side of said brake element with the intake side thereof, a valve adapted to open and close said conduits simultaneously, said valve being provided with a control member having one portion subject to the pressure of the operating fluid in said brake element and another opposed portion subject to a predetermined pressure.

15. In vehicle braking mechanism, a brake element of the pump type, a closed conduit joining the discharge side of said element to an intake port therein, a valve adapted to open and close said conduit, said valve being provided with a control member having one portion subject to the pressure of the operating fluid in said brake element, and another opposed portion subject to a predetermined pressure, means for varying said pressure and thus the point at which relative movement of said member takes place to operate said valve.

16. In vehicle braking mechanism, a brake element of the pump type, a closed conduit joining the discharge side of said element to an intake port therein, a valve adapted to open and close said conduit, said valve being provided with a distortable diaphragm having one face subject to the pressure of the operating fluid in said brake element and the other face subject to a predetermined pressure and means for varying said pressure and thus the point at which distortion of said diaphragm takes place to operate said valve.

17. In vehicle braking mechanism, a brake element of the rotary pump type provided with a casing, an eccentrically-mounted rotor journaled therein, the space between the periphery of the rotor and said bore of said casing constituting a pumping chamber, extensible vanes carried by said rotor extending thru said chamber and engaging the bore of said casing, a plurality of chambers arranged in said rotor and communicating with the pumping chamber only thru the operating clearance between said rotor and said casing, an aperture leading thru said casing and operating so as to communicate with said rotor chambers, thereby to prevent a partial vacuum from being set up in said rotor chambers.

CLIFFORD H. ROGERS.